United States Patent [19]
McEntee

[11] Patent Number: 5,392,948
[45] Date of Patent: Feb. 28, 1995

[54] MIXING BOWL

[75] Inventor: Kathy McEntee, Baldwinville, Mass.

[73] Assignee: Tucker Housewares, Leominster, Mass.

[21] Appl. No.: 246,130

[22] Filed: May 19, 1994

[51] Int. Cl.⁶ .............................................. B65D 21/00
[52] U.S. Cl. ................................. 220/669; 220/657; 220/574; 220/912; 222/478; 222/572
[58] Field of Search ............... 220/669, 574, 657, 912; 222/475, 478, 572

[56] References Cited

U.S. PATENT DOCUMENTS

| | | |
|---|---|---|
| D. 104,168 | 4/1937 | Mackelfresh, Jr. |
| D. 192,943 | 5/1962 | Eicholtz . |
| D. 206,773 | 1/1967 | Reny . |
| D. 218,089 | 7/1970 | Chadbourne . |
| D. 230,724 | 8/1980 | Trump . |
| D. 248,278 | 6/1978 | Holden, Jr. . |
| D. 262,682 | 1/1982 | Morin . |
| D. 309,554 | 7/1990 | Meisner . |
| D. 317,125 | 5/1991 | Ambasz . |
| 367,250 | 7/1887 | Sperry ........................... 222/478 X |
| 747,249 | 12/1903 | Smith ................................... 222/572 |
| 2,121,654 | 6/1938 | Donchian . |
| 2,262,204 | 11/1941 | Rideout ........................... 220/657 X |
| 2,873,120 | 8/1932 | Hall . |
| 3,233,812 | 2/1966 | Kennedy . |
| 4,204,609 | 5/1980 | Kuhn ................................ 220/657 X |
| 5,203,836 | 4/1993 | Brazis et al. . |

Primary Examiner—Steven M. Pollard
Attorney, Agent, or Firm—Darby & Darby

[57] ABSTRACT

A nestable, stackable mixing bowl is provided having a radiused sidewall and a wide concave rim flange. The rim flange provides a handle around the entire circumference of the bowl, providing an easy way to grasp the bowl while pouring. The rim flange is provided with three integral equidistantly spaced pourspouts, thus requiring less manipulation for positioning the bowl for pouring. The bottom of the bowl is provided with an annular rib to provide stability to the bowl. The bowl is also provided with a lid shaped to cover the bowl and to accept the rim flange. The lid has a central circular depressed portion sized to matingly engage the bottom rib of a smaller capacity bowl, providing stable stacking.

10 Claims, 6 Drawing Sheets

MIXING BOWL

BACKGROUND OF THE INVENTION

This invention relates to a novel mixing bowl. In particular, a mixing bowl is provided having a rim with three integral equidistantly spaced pourspouts.

Mixing bowls are commonly used in the preparation of food by people of all ages and physical conditions. Mixing bowls that are presently available are difficult to hold when filled and are difficult to pour from, particularly by persons having an arthritic condition. Such persons may have difficulty in lifting, turning, squeezing, gripping, toting, and bending manipulations. The bowl rim is narrow and thus difficult to grip. Further, if the bowl is provided with a pourspout, the bowl must be manipulated to properly position the pourspout.

U.S. Pat. No. 5,203,836 to Brazis et al. discloses a nestable mixing bowl with a rim flange. The rim flange provides an integral handle on one side of the bowl, and a pourspout on the other. U.S. Pat. No. Des. 262,682 to Morin discloses a mixing bowl having a pourspout and a handle. Both bowls have only a single pouring position and must be manipulated to properly position the pourspout for pouring. Further, the handle provided is only available for one hand, and does not provide a means to hold the bowl with two hands.

Neither the Brazis et al. mixing bowl nor others presently available meet the needs of users who have particular difficulties with motor skills involving the hands, while at the same time being attractive and not easily identifiable as a "special" product designed for physically challenged users. This latter consideration is especially important in avoiding stigma, and maintaining the user's self-esteem. Thus, there is a need for mixing bowls which, although designed with particular features easing their use by persons afflicted by arthritis and other like conditions, would be attractive and useful to all users of all ages and physical capacities.

SUMMARY OF THE INVENTION

It is an object of the invention to provide a mixing bowl that overcomes the prior mentioned shortcomings. In particular, it is an object of the invention to provide a mixing bowl that is easy to grip and pour from.

It is another object of the invention to provide a mixing bowl having a handle that does not interfere with nesting.

It is another object of the invention to provide a mixing bowl requiring minimum manipulation to place in pouring position.

It is another object of the invention to provide a mixing bowl having an integral handle that may be held with two hands.

It is another object of the invention to provide a mixing bowl with a lid which will easily nest in other similarly designed mixing bowls with lids.

It is another object of the invention to provide a lid for a mixing bowl that will provide stacking stability.

In an illustrative embodiment of the present invention, a nestable mixing bowl is provided having a radiused sidewall and a wide concave rim flange. The rim flange provides a handle around the entire circumference of the bowl, providing an easy way to grasp the bowl while pouring. The rim flange is provided with three integral equidistantly spaced pourspouts, thus requiring less manipulation for positioning the bowl for pouring.

The bowl is also provided with a lid shaped to cover the bowl and to accept the rim flange. The lid is provided with a central circular depressed portion sized to matingly engage the bottom rib of a smaller capacity bowl to provide stable stacking.

BRIEF DESCRIPTION OF THE DRAWINGS

The foregoing and other features of the present invention will be more readily apparent from the following detailed description of preferred embodiments taken in conjunction with the attached drawings wherein.

DETAILED DESCRIPTION OF PREFERRED EMBODIMENTS

Figure 1:
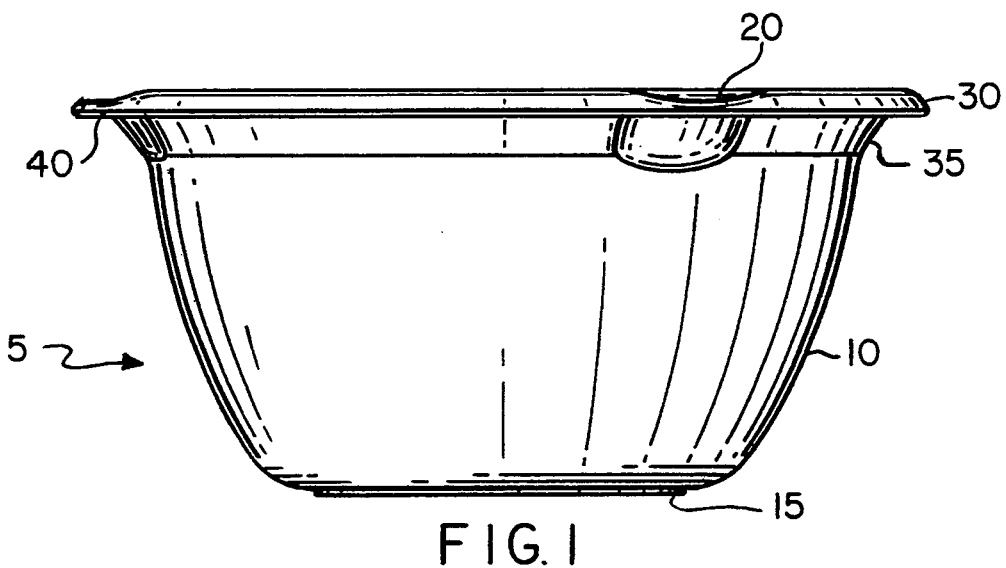
FIG. 1 is a front elevational view of a preferred embodiment of the mixing bowl.

Referring to FIGS. 1 and 3–5 the mixing bowl 5 of the present invention comprises a bowl having a circular bottom 15 and a radiused sidewall 10 extending from the bottom 15 to a rim 35. A downwardly concave rim flange 30 is provided around the circumference of rim 35. The rim flange 30 defines a channel 40 wherein the channel 40 is of constant dimension. The channel 40 is sufficiently wide to admit the digits of a hand, thereby providing a handle around the entire circumference of the bowl. The bowl is preferably manufactured by injection molding, and is preferably made of polypropylene. Alternatively, any other suitable plastic or stainless steel could be employed. Any conventionally suitable forming process may also be employed, depending upon the chosen alternative material. As shown, the bowl 5 has smooth interior surfaces for ease of mixing and cleaning.

Figure 2:
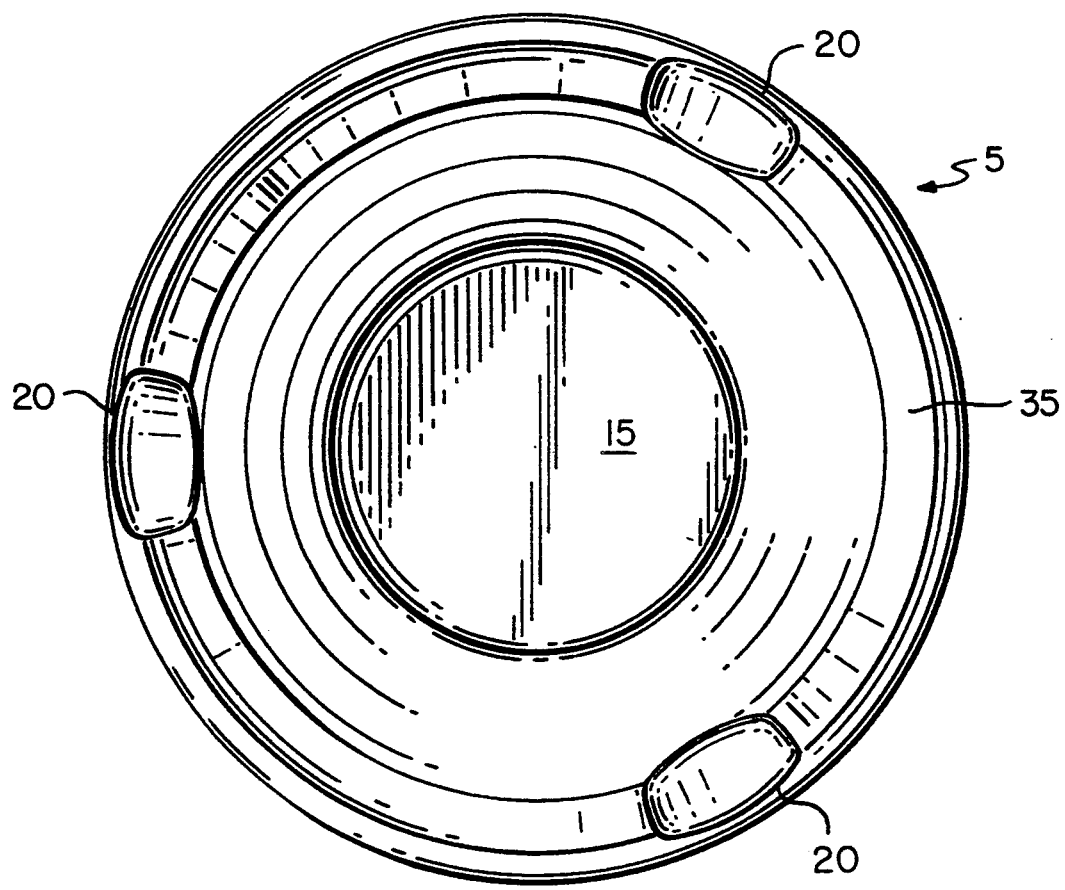
FIG. 2 is a top plan view thereof.
Figure 3:
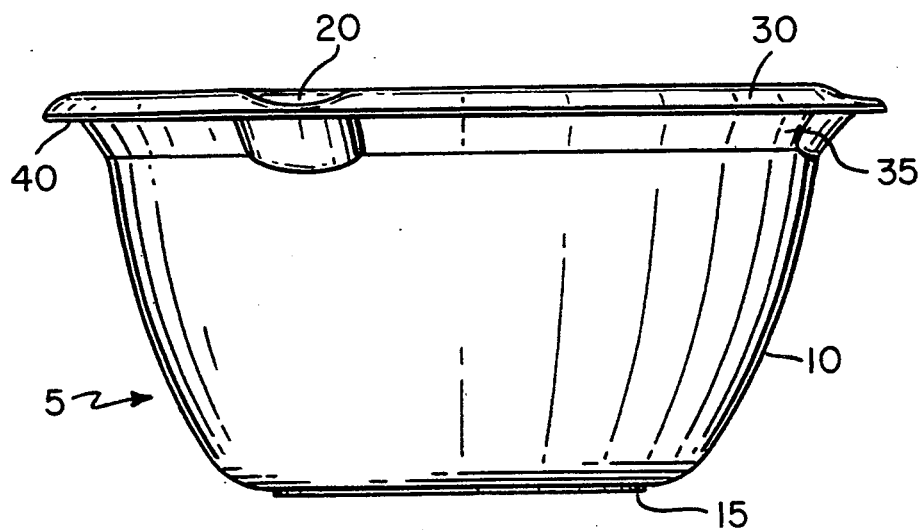
FIG. 3 is a rear elevational view thereof.
Figure 4:
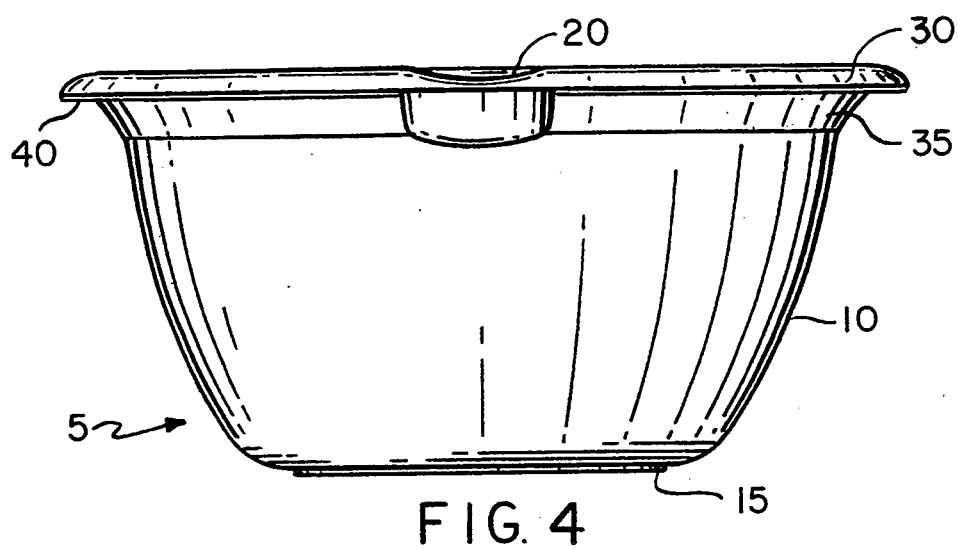
FIG. 4 is a left elevational view thereof.
Figure 5:
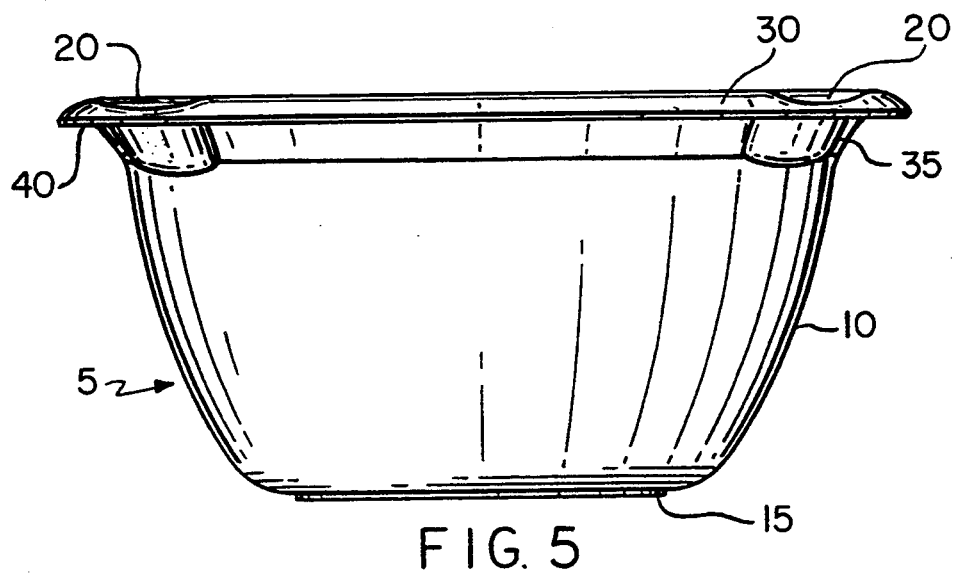
FIG. 5 is a right elevational view thereof.
Figure 6:
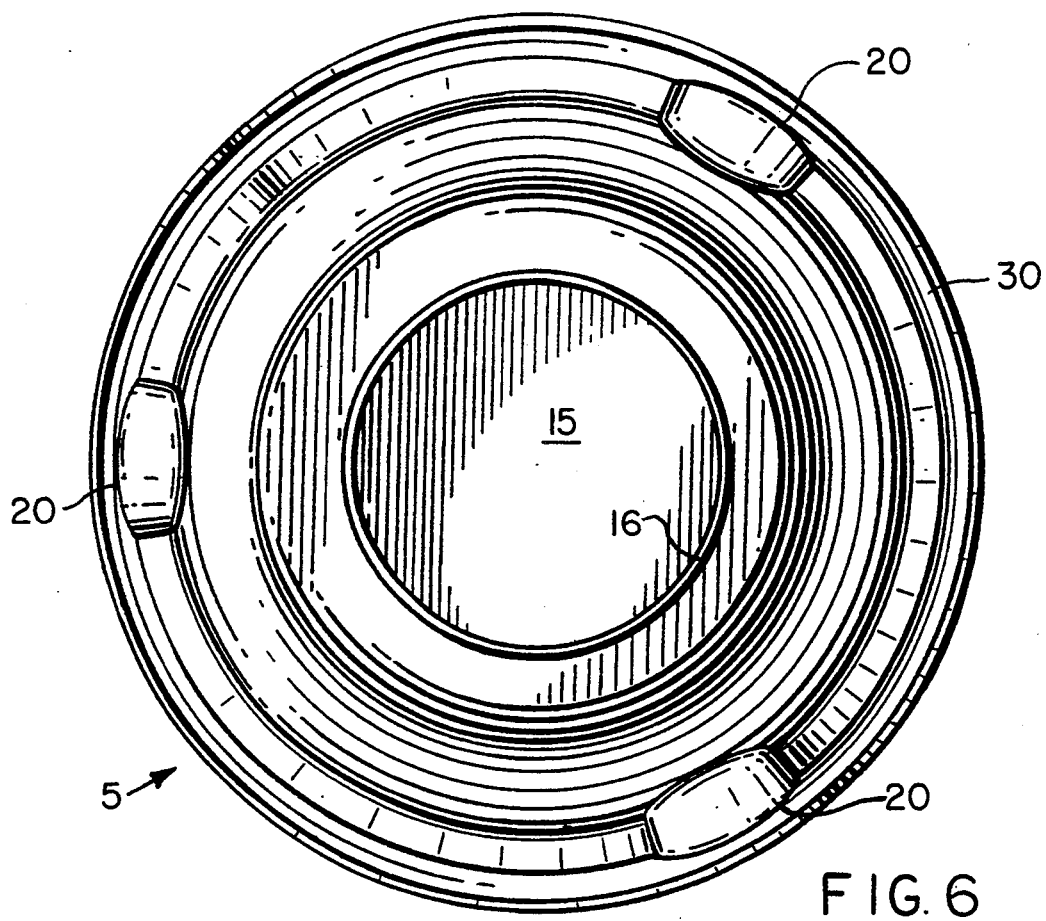
FIG. 6 is bottom plan view thereof.
Figure 7:
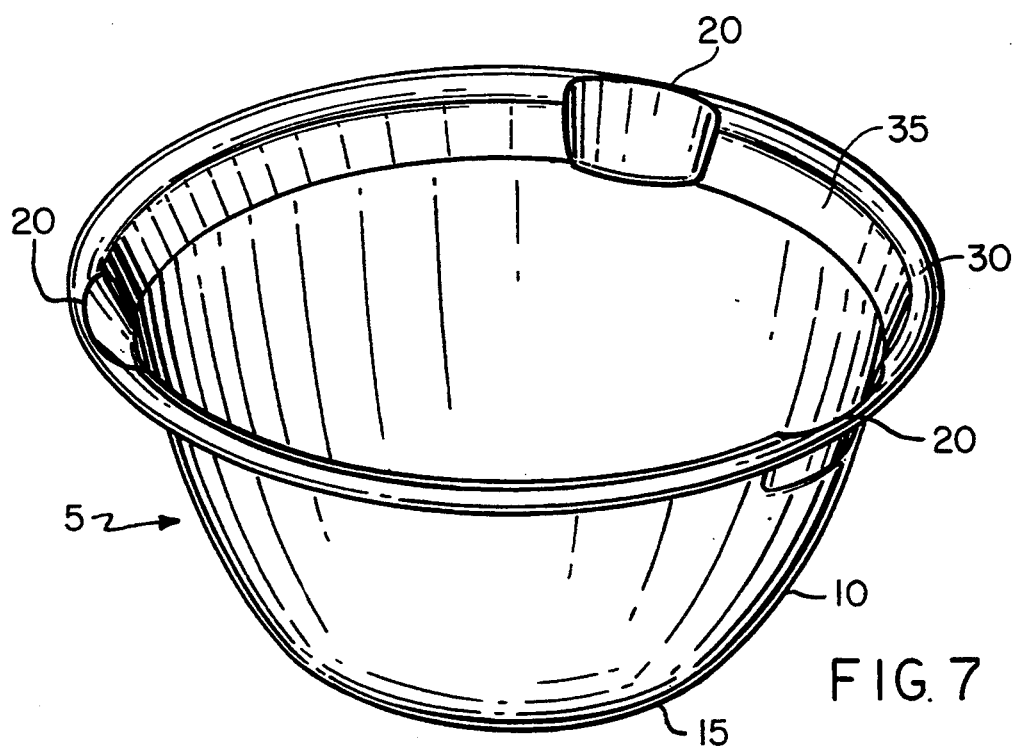
FIG. 7 is a perspective view thereof.

Referring now to FIGS. 2, 6, and 7, the rim flange 30 is provided with three equidistantly spaced integrally molded pourspouts 20. The three pourspouts 20 provide the advantage that the mixing bowl requires minimal manipulation to properly position the mixing bowl for pouring. The bowl may be held in any position along rim flange 30 or around sidewall 10, and will nearly always have a pourspout which is properly positioned or nearly properly positioned for pouring.

The bowl may also be held with two hands along the rim flange 30, for example on either side of a pourspout 20, or with one hand along the portion of the rim flange 30 opposite a pourspout 20 and one hand on the portion of the sidewall 10 below the pourspout.

Figure 13:
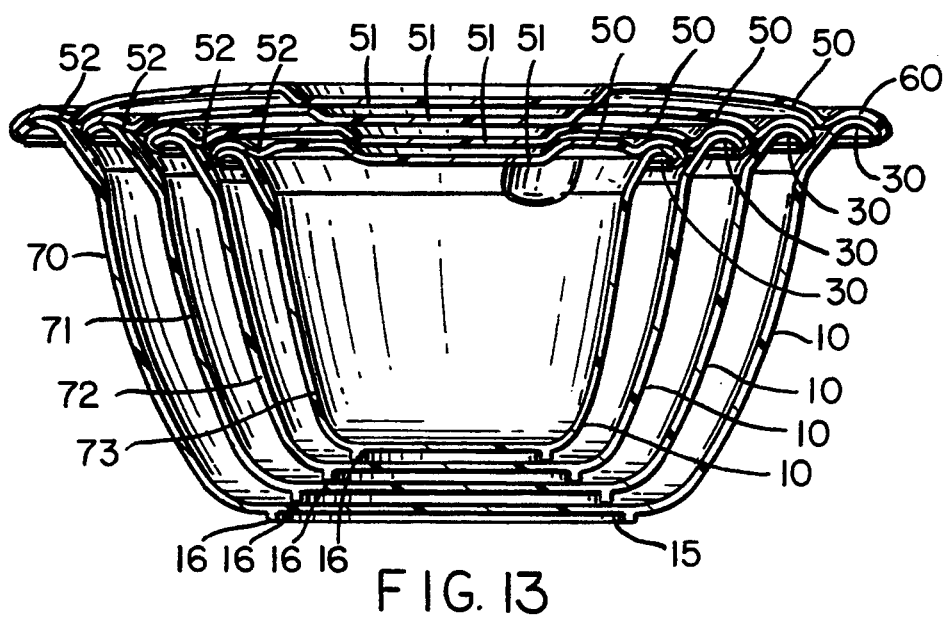
FIG. 13 is a sectional view of four nested bowls with preferred lids.

The bottom 15 preferably includes a annular raised bottom rib 16, as most clearly shown in the FIGS. 6 and 13. The bottom rib 16 provides stability to the mixing bowl.

Figure 8:
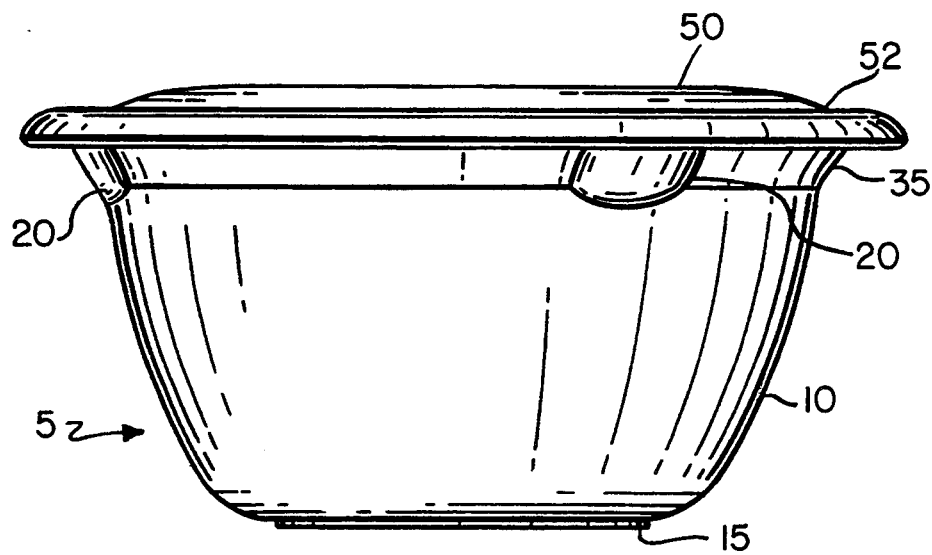
FIG. 8 is a front elevational view of a preferred embodiment of the mixing bowl with a preferred lid.
Figure 9:
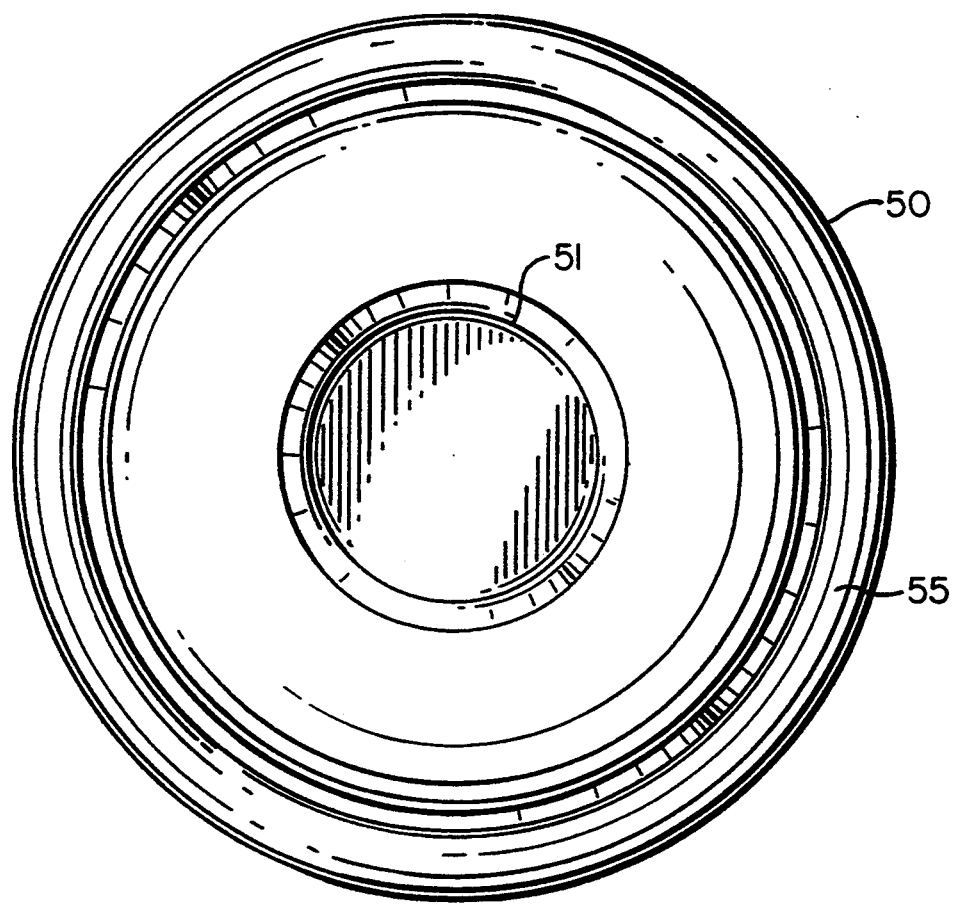
FIG. 9 is a top plan view of the preferred lid.
Figure 10:
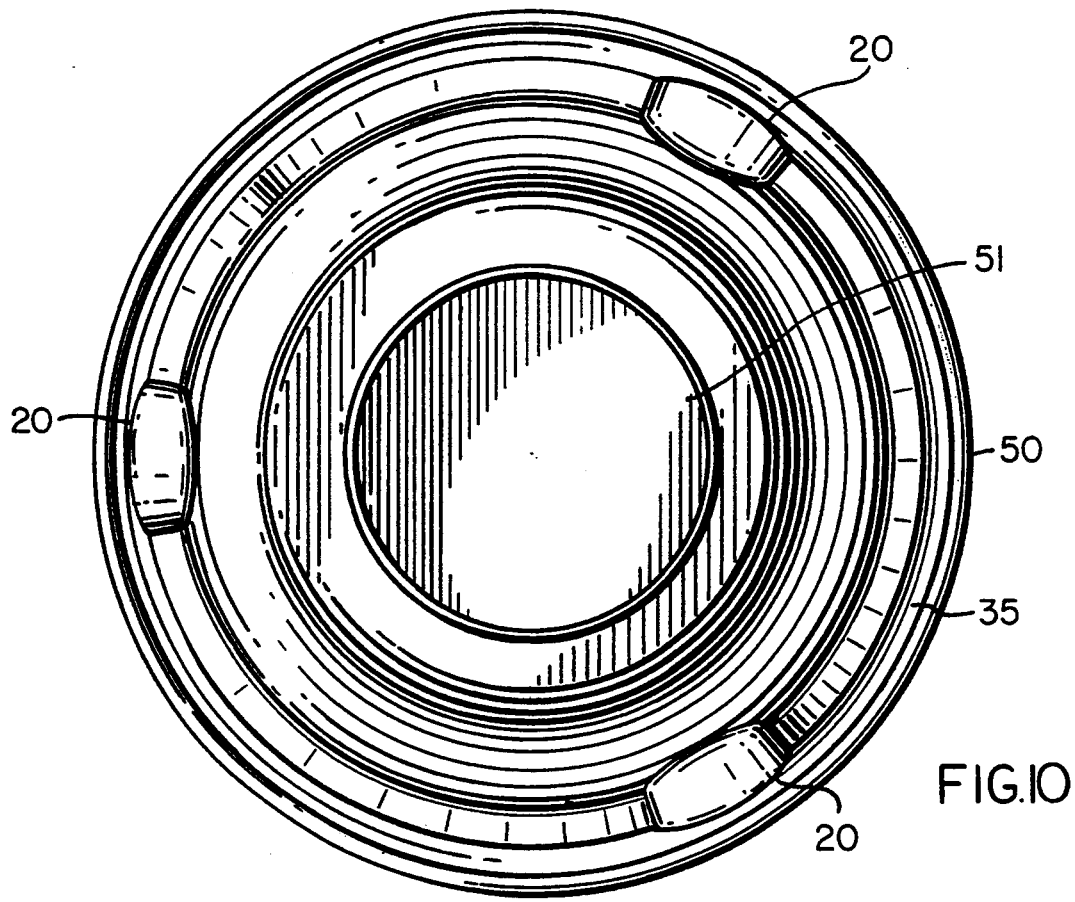
FIG. 10 is a bottom plan view of the preferred embodiment of the mixing bowl with a preferred lid.
Figure 11:
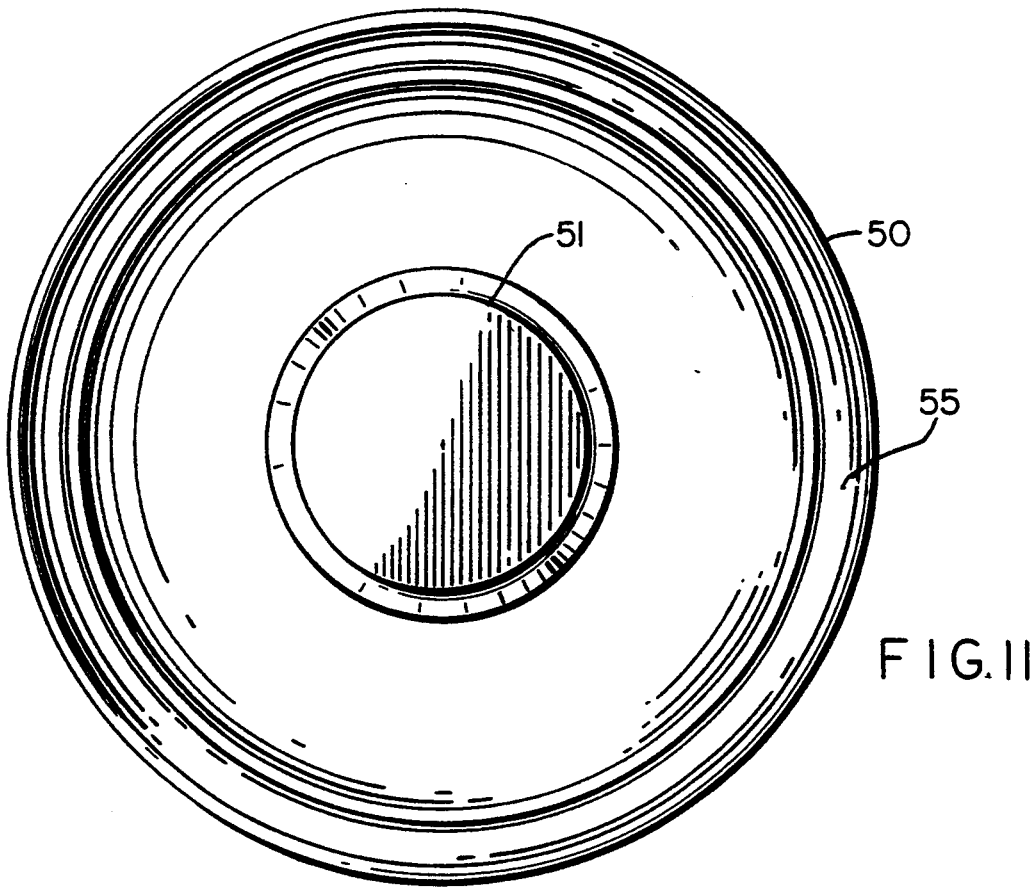
FIG. 11 is a bottom plan view of the preferred lid.
Figure 12:
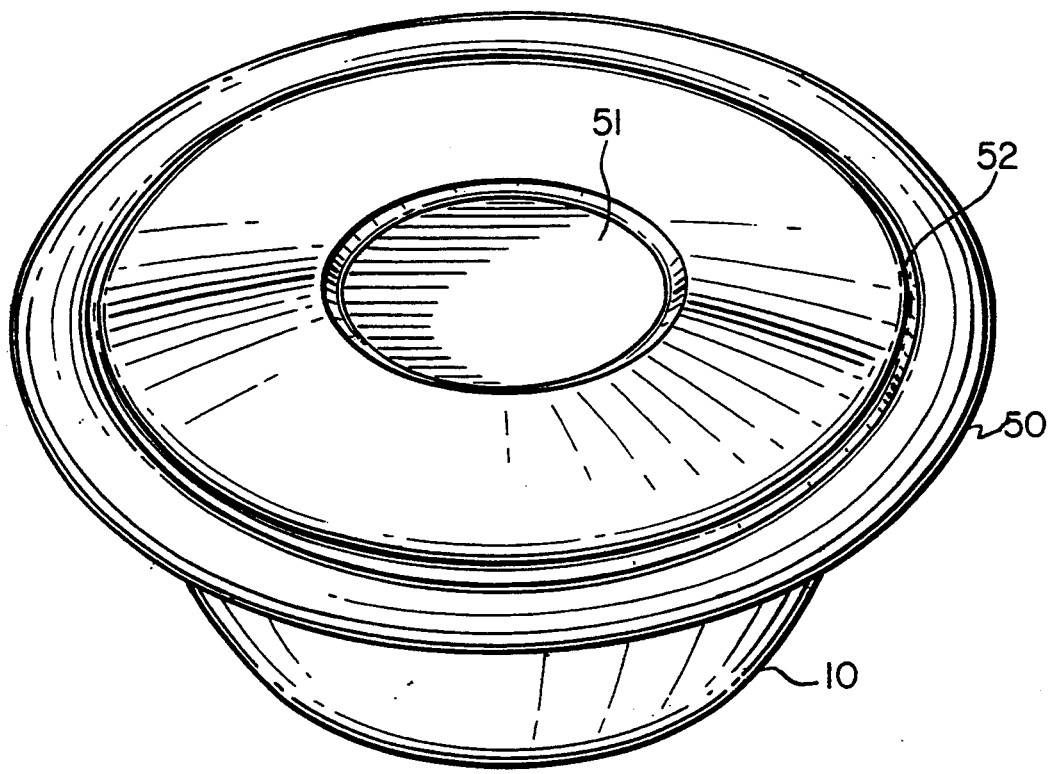
FIG. 12 is a perspective view of the preferred lid.

FIGS. 9 and 11 illustrate a circular lid 50 formed to cover mixing bowl of the present invention. The lid 50 is preferably made of dishwasher safe polypropylene. Lid 50 is provided with a downwardly concave lid flange 55. The lid flange defines a lid channel 60, more clearly shown in cross section in FIG. 13. The lid channel 60 is sufficiently wide and has a sufficient radius of curvature to nestingly engage rim flange 30 as shown in FIGS. 8, 10, and 12. Further, the lid channel 60 is sized to allow the lid 50 to provide an seal for the mixing bowl 5.

As illustrated in FIGS. 11, 12, and 13, the lid 50 preferably has a circular, centrally depressed portion 15. In an embodiment of the invention including multiple nesting mixing bowls, the centrally depressed portion 15 is sized to accept the bottom rib 16 of a like-configured but smaller sized bowl. Thus, the centrally depressed portion 15 provides for stable stacking of like-configured, differently sized covered bowls according to the invention.

The lid 50 is further preferably provided with an annular depressed portion 52 located toward the periphery of the lid 50. The annular depressed portion 52 is positioned to accept the lid flange 55 of a like-configured smaller sized lid. Thus the annular depressed portion 52 provides a means to stably stack like configured lids.

FIG. 13 illustrates the nestability of the mixing bowls of the present invention. In particular, four mixing bowls 70–73, each having a lid 50 thereon, are shown nested. Each mixing bowl 70–73 is like-configured and is sized to fit inside the next larger sized bowl. As shown in the figures, neither the rim flanges 30 nor the lids 50 interfere with nesting.

While the present invention has been particularly shown and described with reference to preferred embodiments thereof, it will be understood by those skilled in the art that various changes in form and details may be made therein without departing from the spirit and scope of the invention.

What is claimed is:

1. A bowl having a bottom surface and a radiused sidewall, the sidewall extending from the bottom surface to a top bowl rim, the improvement comprising:
   the bowl having a downwardly concave first rim flange extending continuously about a perimeter of the top rim, said first rim flange defining a continuous channel extending along said top bowl rim, said channel having a constant width, said first rim flange forming a continuous handle, said rim flange further having three equidistantly spaced pourspouts formed therein.

2. The bowl of claim 1 wherein said channel is of sufficient width to admit digits of a hand.

3. The bowl of claim 1 wherein said bottom surface of said bowl further comprises an annular bottom rib.

4. The bowl of claim 1, said bowl being adapted to nest within a like-configured second bowl of larger capacity.

5. The bowl of claim 4, said bowl being adapted to nest within a like-configured second bowl of larger capacity, both with and without said lid positioned on said bowl, and both with and without a second like-configured but larger lid positioned on said second larger capacity bowl.

6. The bowl of claim 1 further comprising a lid, said lid having a downwardly concave second rim flange adapted to matingly engage said first rim flange.

7. The bowl of claim 6 wherein said bottom surface of said bowl further comprises an annular bottom rib.

8. The bowl of claim 7, said lid further comprising a central circular depressed portion sized to matingly engage a bottom rib of a second like-configured bowl of smaller capacity.

9. The bowl of claim 8, said lid further comprising an annular depressed portion positioned to matingly engage a second rim flange of a second like-configured lid of smaller size.

10. The bowl of claim 6, wherein said rim flange is sized to provide an airtight seal to said bowl.

* * * * *